United States Patent
Jung et al.

(10) Patent No.: US 10,237,814 B2
(45) Date of Patent: Mar. 19, 2019

(54) METHOD FOR TRANSMITTING D2D DISCOVERY MESSAGE PERFORMED BY TERMINAL IN WIRELESS COMMUNICATION SYSTEM, AND TERMINAL USING SAID METHOD

(71) Applicant: LG Electronics Inc., Seoul (KR)

(72) Inventors: Sunghoon Jung, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 117 days.

(21) Appl. No.: 15/524,433

(22) PCT Filed: Nov. 6, 2015

(86) PCT No.: PCT/KR2015/011932
§ 371 (c)(1),
(2) Date: May 4, 2017

(87) PCT Pub. No.: WO2016/072797
PCT Pub. Date: May 12, 2016

(65) Prior Publication Data
US 2018/0288685 A1    Oct. 4, 2018

Related U.S. Application Data

(60) Provisional application No. 62/076,443, filed on Nov. 6, 2014.

(51) Int. Cl.
*H04L 12/28*    (2006.01)
*H04W 48/16*    (2009.01)
(Continued)

(52) U.S. Cl.
CPC .......... *H04W 48/16* (2013.01); *H04W 52/34* (2013.01); *H04W 72/02* (2013.01); *H04W 72/04* (2013.01); *H04W 76/27* (2018.02)

(58) Field of Classification Search
USPC .......................... 370/252, 254, 278, 329, 386
See application file for complete search history.

(56) References Cited

U.S. PATENT DOCUMENTS

| | | |
|---|---|---|
| 2012/0243431 A1 | 9/2012 | Chen et al. |
| 2014/0094212 A1* | 4/2014 | Ahn .................. H04W 4/70 455/517 |

(Continued)

OTHER PUBLICATIONS

Deutsche Telekom, "Introduction of Multiple Power Levels for different Disco very Range Classes", R2-144224, 3GPP TSG RAM WG2 Meeting #87bis, Shanghai, China, Sep. 26, 2014.

(Continued)

*Primary Examiner* — John Pezzlo
(74) *Attorney, Agent, or Firm* — Dentons US LLP

(57) ABSTRACT

Provided are a method for transmitting a device-to device (D2D) discovery message performed by a terminal in a wireless communication system, and a terminal using said method. The method determines individual range classes for a plurality of D2D discovery resource pools; selects a D2D discovery resource pool having a higher ranger class when it is not possible to find a D2D resource pool having the same range class as the range class of the D2D discovery message from the plurality of D2D discovery resource pools; and transmits the D2D discovery message using the selected D2D discovery resource pool.

9 Claims, 17 Drawing Sheets

(51) Int. Cl.
*H04W 72/02* (2009.01)
*H04W 72/04* (2009.01)
*H04W 76/27* (2018.01)
*H04W 52/34* (2009.01)
*H04J 1/16* (2006.01)

(56) References Cited

U.S. PATENT DOCUMENTS

2014/0130137 A1* 5/2014 Baek .................. H04W 12/08
726/4
2014/0274183 A1 9/2014 Zhu et al.

OTHER PUBLICATIONS

Deutsche Telekom, "Introduction of Multiple Power Levels for different Disco very Range Classes", R2-144244, 3GPP TSG RAM WG2 Meeting #87bis, Shanghai, China, Sep. 26, 2014.
Intel Corporation, "Remaining Details of D2D Discovery Resource Allocation", R1-143766, 3GPP TSG RAN WG1 Meeting #78bis, Ljubljana, Slovenia, Sep. 27, 2014.
"3GPP; TSGs and SA; Proximity-based Services (ProSe), Stage 2, (Release 12)", 3GPP TS 23.303 V12.2.0, Sep. 22, 2014.
User Equipment (UE) procedures in idle mode (Release 8); 3GPP TS 36.304 V8.5.0, Mar. 2009.

* cited by examiner

METHOD FOR TRANSMITTING D2D DISCOVERY MESSAGE PERFORMED BY TERMINAL IN WIRELESS COMMUNICATION SYSTEM, AND TERMINAL USING SAID METHOD

CROSS-REFERENCE TO RELATED APPLICATIONS

This application is the National Stage filing under 35 U.S.C. 371 of International Application No. PCT/KR2015/011932, filed on Nov. 6, 2015, which claims the benefit of U.S. Provisional Application No. 62/076,443 filed on Nov. 6, 2014, the contents of which are all hereby incorporated by reference herein in their entirety.

BACKGROUND OF THE INVENTION

Field of the Invention

The present invention relates to wireless communication, and more particularly, to a D2D discovery message transmission method performed by a terminal in a wireless communication system and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, the network may set a plurality of resource pools for D2D operation. At this time, an index may be set for each resource pool, which indicates what usage each resource pool has. In addition, a message related to the D2D operation to be transmitted by the terminal may be classified based on importance and usage thereof. In such a case, it may be inefficient to randomly select a D2D resource pool to transmit a message related to the D2D operation. Further, when there is no optimum D2D resource pool determined based on the importance/usage of the message related to the D2D operation, how to transmit the message related to the D2D operation may be issue.

SUMMARY OF THE INVENTION

The present invention provides a D2D discovery message transmission method performed by a terminal in a wireless communication system and a terminal using the method.

In an aspect, a method for transmitting a device-to-device (D2D) discovery message using a user equipment (UE) in a wireless communication system is provided. The method comprises determining a range class for each of a plurality of D2D discovery resource pools, selecting a D2D discovery resource pool having a range class longer than the range class of the D2D discovery message if determination that a D2D discovery resource pool having the same range class as a range class of a D2D discovery message is absent among the plurality of D2D discovery resource pools and transmitting the D2D discovery message using the selected D2D discovery resource pool.

The method may further comprise receiving an index for each of the plurality of D2D discovery resource pools.

The index may indicate a range in which a corresponding D2D discovery resource pool is available.

The method may further comprise setting a transmission power parameter for each of the plurality of D2D discovery resource pools.

Transmitting the D2D discovery message using the selected D2D discovery resource pool may comprise selecting, by the UE, a second transmission power parameter other than a first transmission power parameter, wherein the first parameter is set for the selected D2D discovery resource pool by the network and transmitting the D2D discovery message based on the second transmission power parameter.

The first parameter may be determined based on a range class of the D2D discovery resource pool, wherein the second parameter is selected by the UE to limit a transmission power determined based on the first parameter.

The range classes for the plurality of D2D discovery resource pools may include a long range, a medium range, and a short range.

The range class for the D2D discovery message may include one of a long range, a medium range, and a short range.

In another aspect, a user equipment (UE) is provided. The UE comprises a radio frequency (RF) unit configured to transmit and receive a radio signal and a processor coupled to the RF unit, wherein the processor is configured to determine a range class for each of a plurality of D2D discovery resource pools, select a D2D discovery resource pool having a range class longer than the range class of the D2D discovery message if determination that a D2D discovery resource pool having the same range class as a range class of a D2D discovery message is absent among the plurality of D2D discovery resource pools and transmit the D2D discovery message using the selected D2D discovery resource pool.

According to the present invention, the terminal can identify the range class for each of the D2D resource pools received from the network to select a suitable D2D resource pool. When the UE cannot select the D2D resource pool having the same range class as the range class of the D2D discovery message to be transmitted, the UE selects a D2D resource pool having a range class higher than the range class of the D2D discovery message. Further, it is possible to prevent transmission of the D2D discovery message with unnecessarily high transmission power by appropriately changing the transmission power parameter set for the selected D2D resource pool by the network.

DESCRIPTION OF EXEMPLARY EMBODIMENTS

Figure 1:
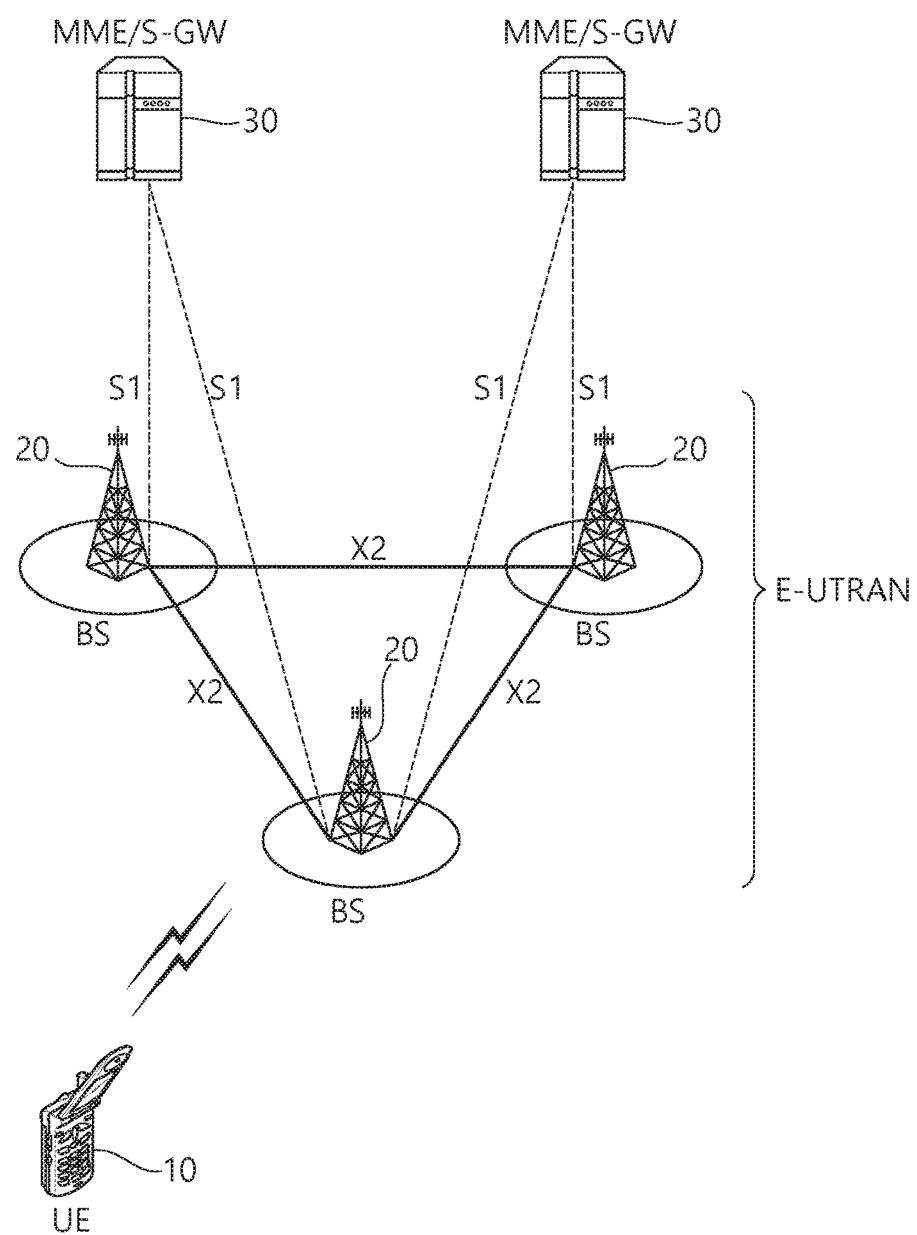
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
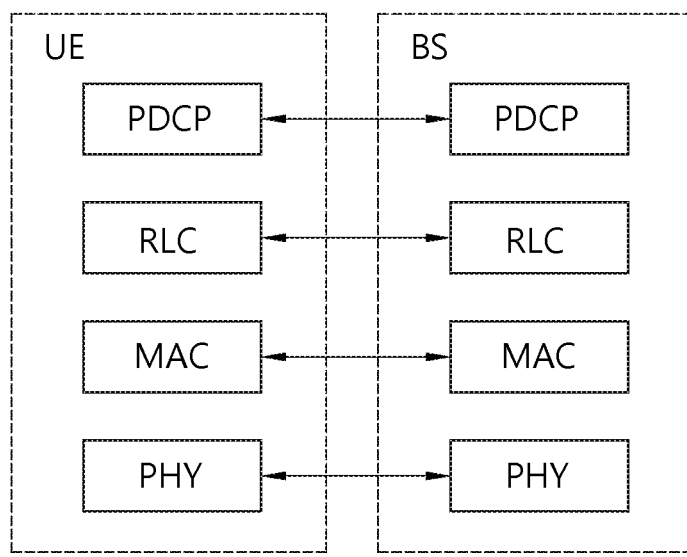
FIG. 2 is a diagram showing a wireless protocol architecture for a user plane.
Figure 3:
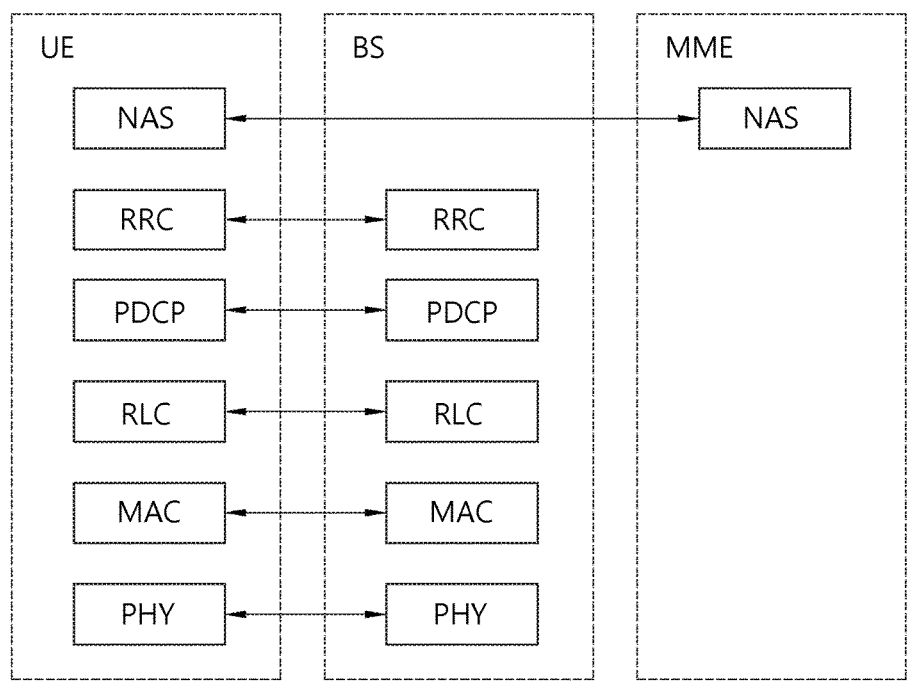
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization.

The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
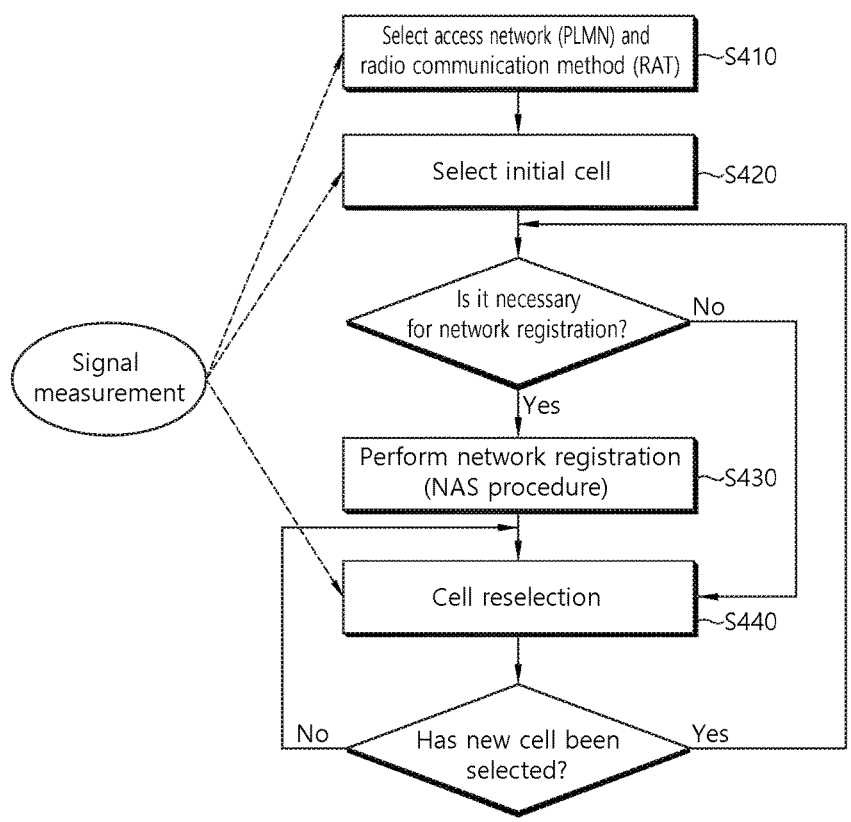
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
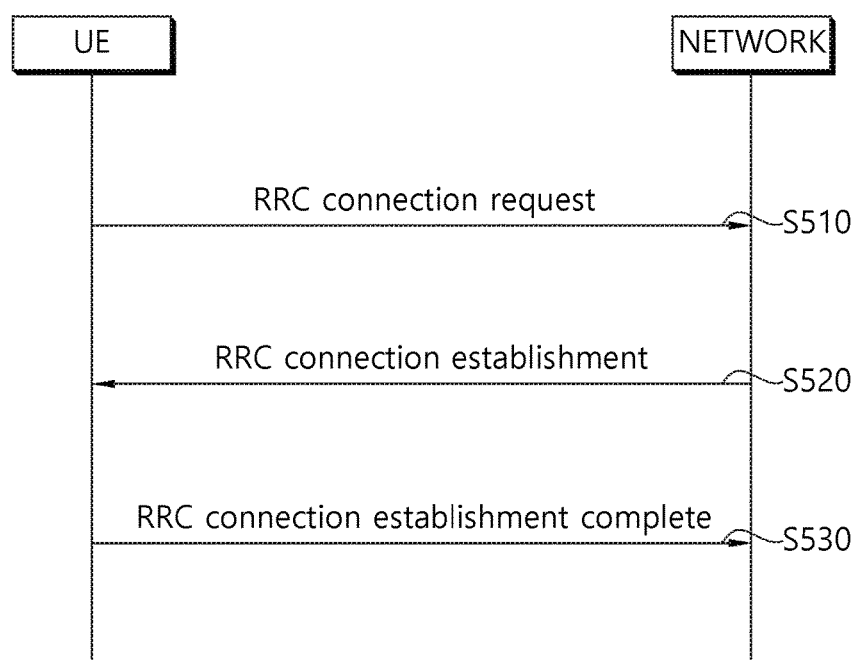
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
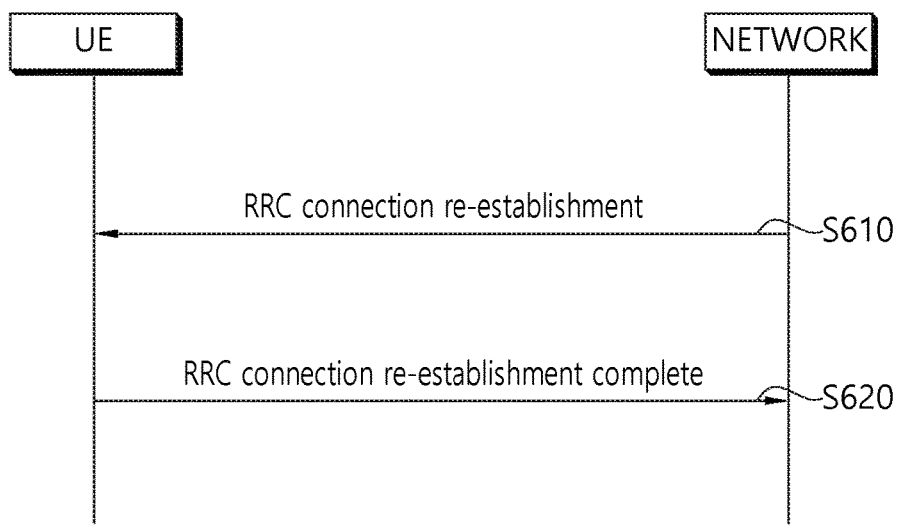
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev>0 \text{ AND } Squal>0. \quad \text{[Equation 1]}$$

where $$Srxlev=Q_{rxlevmeas}-(Q_{rxlevmin}+Q_{rxlevminoffset})-P_{compensation},$$

$$Squal=Q_{qualmeas}-(Q_{qualmin}+Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
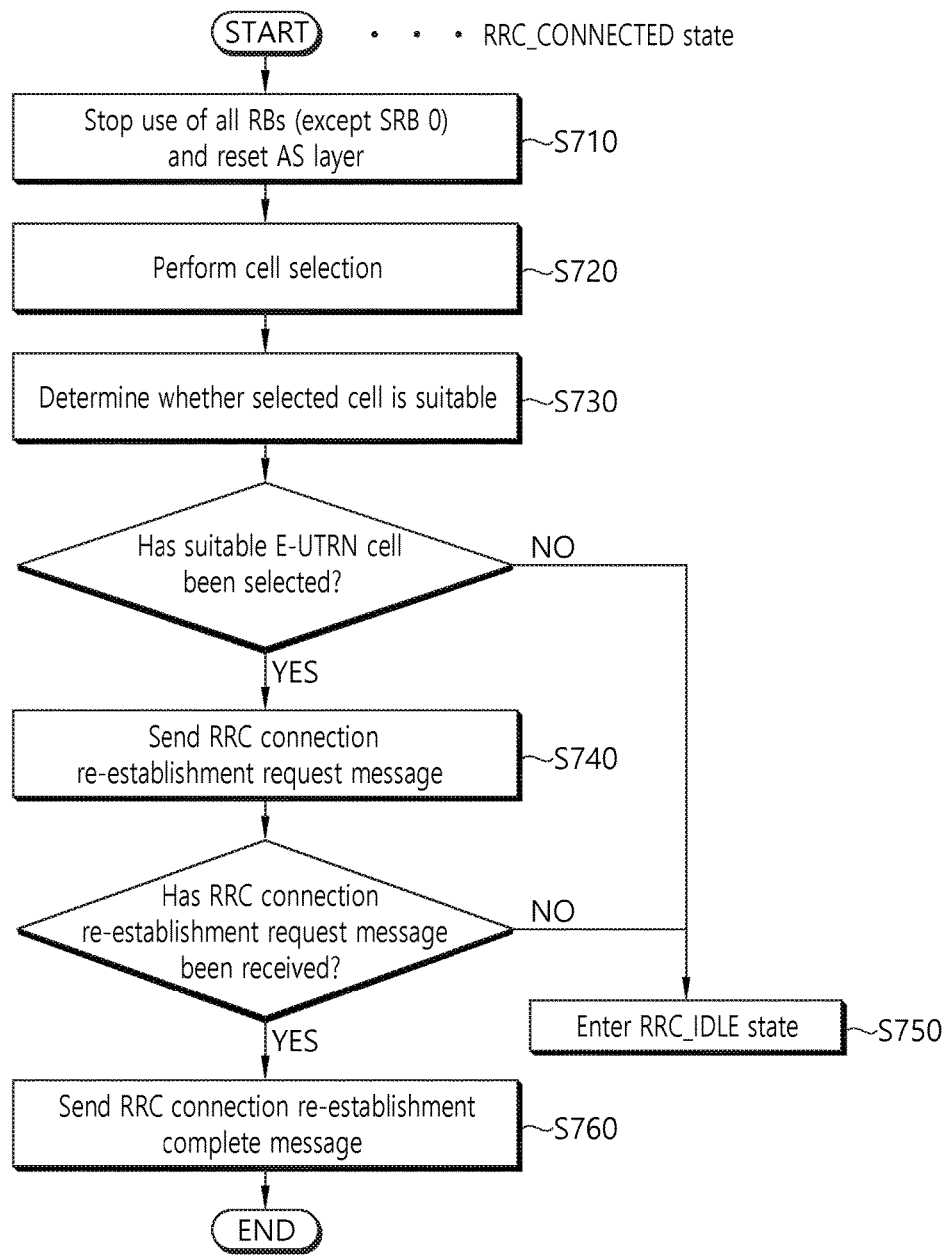
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
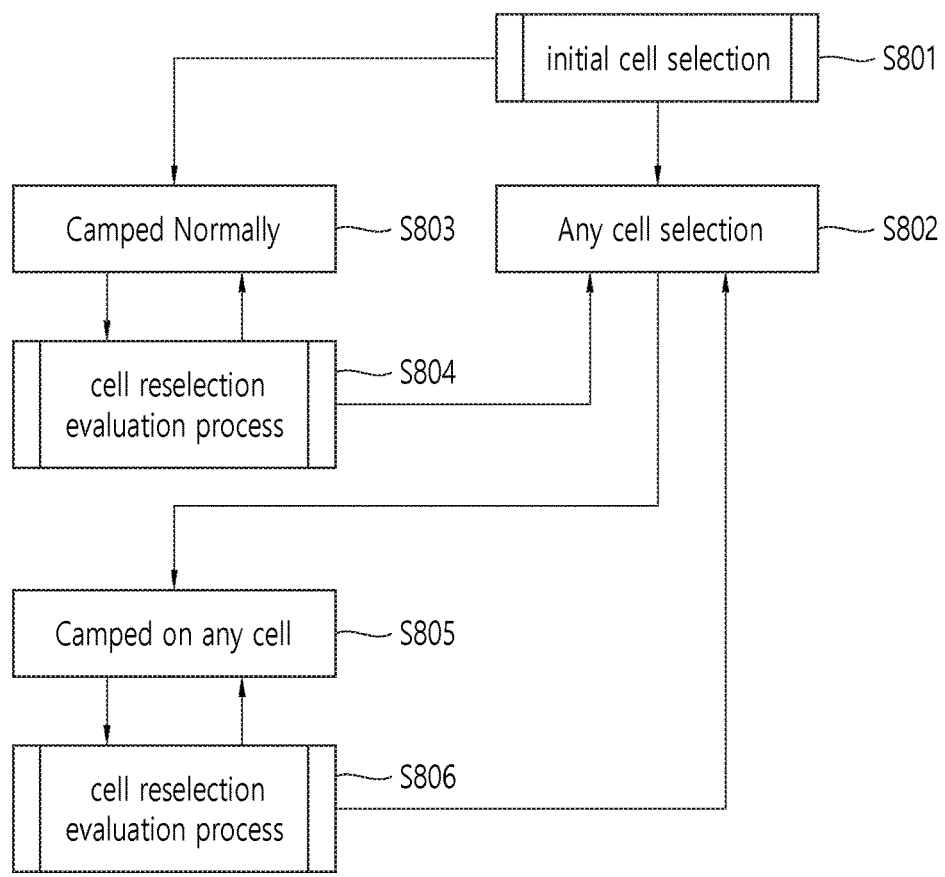
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
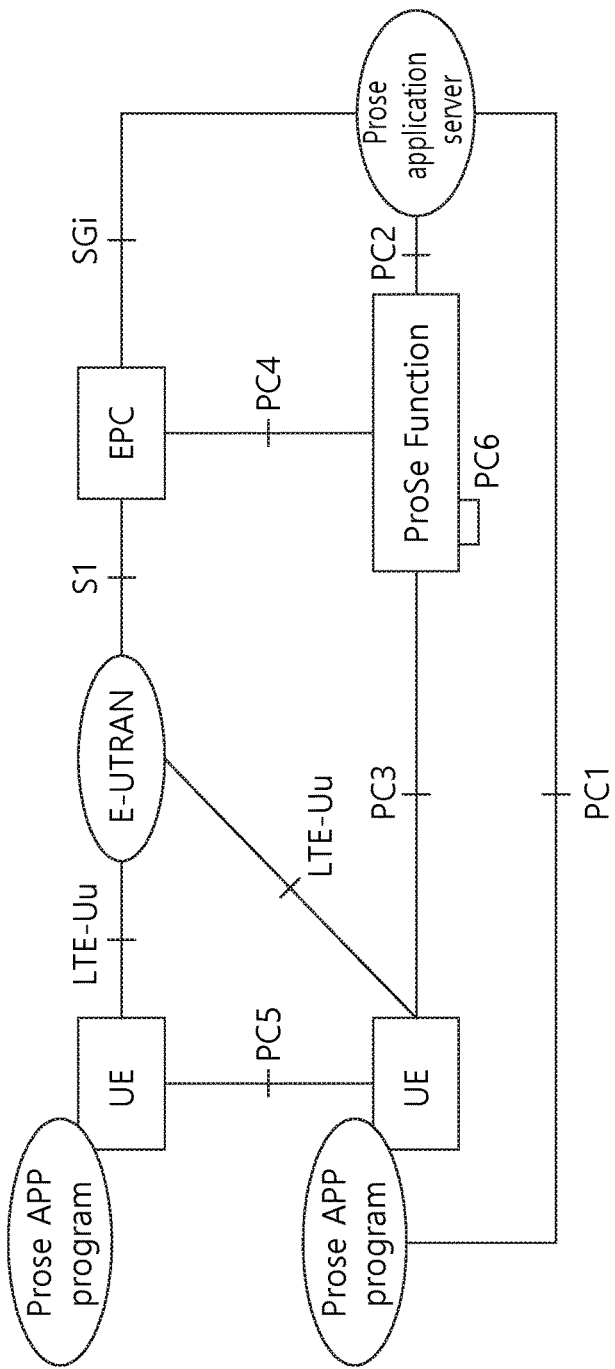
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
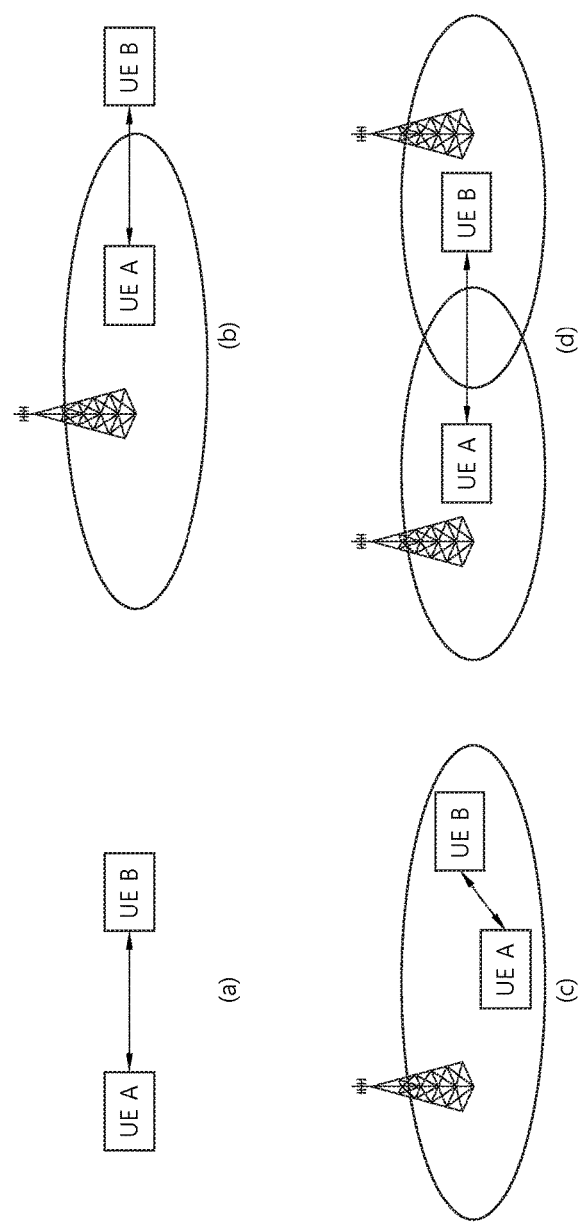
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SAL1 ID: The SAL1 ID represents an in an ID in a scheduling assignment (SA) in the PC 5 interface.

Figure 11:
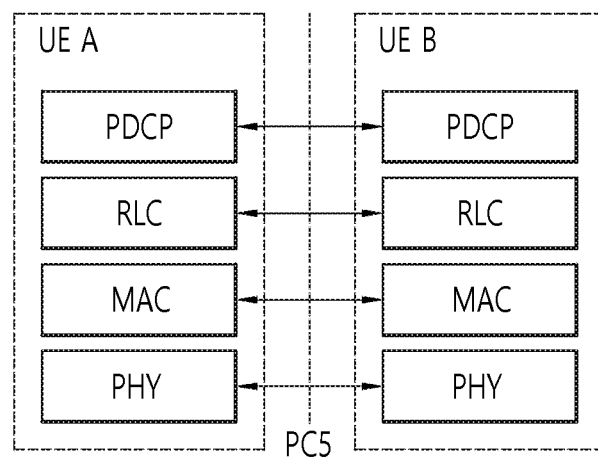
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
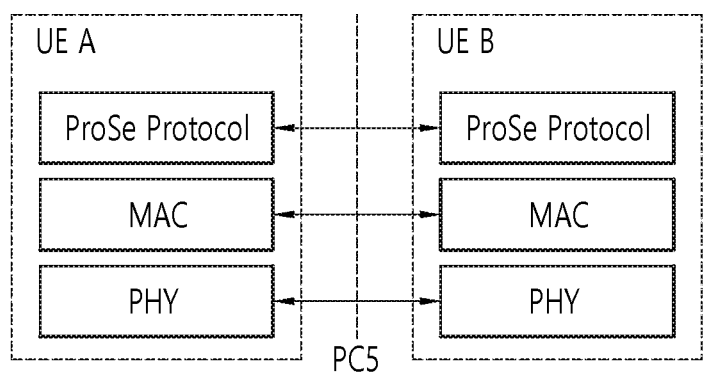
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described in more detail. Hereinafter, ProSe direct communication may be abbreviated as D2D direct communication, direct communication or D2D communication, and ProSe direct discovery may be abbreviated as D2D direct discovery, direct discovery, and D2D discovery.

As described above, a terminal selects a resource to perform direct transmission/reception between terminals from a resource pool. Here, the direct transmission/reception between terminals means direct communication between terminals (for example, ProSe direct communication) or direct terminal discovery (e.g., ProSe direct discovery). When the terminal selects the resource pool, the terminal cannot know the usage for each resource pool. Thus, it is difficult for the terminal to select a resource pool suitable for the usage of the terminal. As a result, the resource pool selection efficiency of the terminal is lowered, and the power management efficiency of the terminal is lowered. In addition, since the terminal cannot select a resource pool suitable for its usage, the network cannot efficiently provide the most suitable service to the terminal, and, thus, the efficiency of the entire network operation is degraded.

Accordingly, in accordance with the present invention, it is proposed that the network provides the terminal with information for identifying the usage of each resource pool for the terminal to be able to distinguish the usage of each resource pool acquired by the terminal. Accordingly, the UE may select a resource pool suitable for the usage of the UE. For example, the network provides information identifying the usage of the resource pool described above in the form of an index, and the terminal determines from the index whether or not each resource pool support a public safety UE and/or a non-safety UE), the discovery range allowed for each resource pool, and whether or not each resource pool supports Prose direct communication within and/or outside of coverage. In this way, the terminal executes the selection of a resource pool suitable for the usage of the terminal. The selection of the resource pool suitable for the usage of the terminal improves the efficiency of resource pool selection and improves the power management efficiency of the terminal. In addition, by selecting the resource pool suitable for the usage of the terminal, the network can efficiently provide the most suitable service to the terminal, thereby improving the efficiency of the entire network operation.

Hereinafter, embodiments of the present invention will be described in more detail with reference to the drawings.

According to the present invention, the network may set to the terminal one or more resource pools that may be used for D2D operation. At this time, for each resource pool, the network may provide the terminal with an index indicating the usage of each resource pool. The index may be included in the setting for the resource pool.

On the other hand, there may be a case where the same index is set for two or more resource pools. For example, when the value of an index indicating that a resource pool may be used for D2D discovery is N, the index with N values may be set for more than one resource pool. In this case, for the terminal to select which resource pool from among the two or more resource pools for D2D discovery may be an issue.

In this case, when there are resource pools satisfying a power setting for the terminal and the network among the two or more resource pools, the terminal may select a random resource pool among the resource pools satisfying the power setting.

Alternatively, the terminal may select a resource pool among the two or more resource pools based on the RSRP measurements. The RSRP measurement for each resource pool may be selected from among a plurality of predetermined candidate values. The candidate values may be set by the network. For example, the measurement candidate values such as {−infinity, −110, −100, . . . , −60, +infinity} dBm may be set by the network. That is, the RSRP measurement value may be calculated to be any one of the candidate values incrementing by 10 dBm.

Meanwhile, the index for the resource pool may indicate a range class to which the resource pool can be applied. For example, a range class may be divided into a short distance, a medium distance, and a long distance. In this connection, when the distance between the terminals is short, the D2D discovery message may be transmitted using a relatively low transmission power. To the contrary, when the distance between the terminals is long, the D2D discovery message may be transmitted using a relatively high transmission power. Additionally or alternatively, the index may indicate whether the resource pool is used only for the public safety terminal, only for the non-public safety terminal, or for both the public safety terminal and the non-public safety terminal.

On the other hand, the messages used for D2D discovery may also be classified into range classes. For example, the range classes may be classified into a short range, a medium distance, and a long distance. Thus, the terminal may determine which range is available to the message. The range class may be set for each ProSe application code included in a message used for D2D discovery.

Consider a D2D discovery message that applies to a specific range class. When attempting to transmit the D2D discovery message, the UE may use only a resource pool having an index indicating the specific range class. That is, when the D2D discovery message belongs to the medium distance range class, only the resource pool which can be used for the medium distance is used.

On the other hand, when transmitting a D2D discovery message applied to a specific range class, a method of using a resource pool having an index indicating a specific range or a range shorter than the specific range may be considered. That is, when the D2D discovery message belongs to a medium distance range class, a method of using a resource pool which can be used for a medium distance or a resource pool which can be used for a short distance may be considered. However, when a resource pool belonging to a range class shorter than the range class to which the D2D discovery message belongs is used, a transmission power lower than the transmission power required when the D2D discovery message is transmitted may be used. Therefore, it is not meaningful to use a resource pool belonging to a range class shorter than the range class to which the D2D discovery message belongs because the D2D discovery message may not be transmitted using the lower transmission power.

When transmitting a D2D discovery message belonging to a specific range class, a resource pool belonging to the specific range may not be found and only a resource pool belonging to a shorter range than the specific range and a resource pool belonging to a longer range than the specific range may be found. In this connection, it may be preferable to use the resource pool belonging to the longer range rather than to use the short range, thereby to allow the D2D discovery message to be transmitted rather than to prevent the D2D discovery message from being transmitted. According to this method, a minimum range may be guaranteed in transmitting the D2D discovery message belonging to a specific range class.

Figure 13:
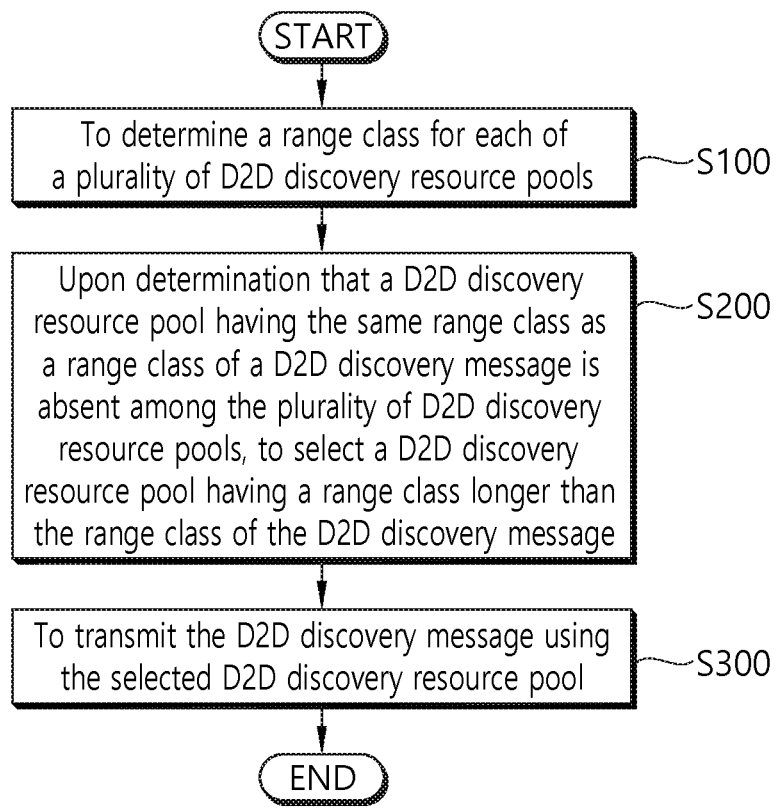
FIG. 13 illustrates a method of transmitting a D2D discovery message by a terminal according to an embodiment of the present invention.

FIG. 13 illustrates a method of transmitting a D2D discovery message by a terminal according to an embodiment of the present invention.

Referring to FIG. 13, the terminal determines a range class for each D2D discovery resource pool (S100).

When the UE cannot find a D2D discovery resource pool having the same range class as the range class for the D2D discovery message, the UE selects a D2D discovery resource pool having a longer range class than the range class for the D2D discovery message (S200).

The terminal transmits the D2D discovery message using the selected D2D discovery resource pool (S300).

On the other hand, when transmitting the D2D discovery message using the D2D discovery resource pool having a range class longer than the range class for the D2D discovery message, UE may transmit the D2D discovery message using a transmit power parameter (which is referred to as a type 2 parameter) other than a transmission power parameter set in the D2D discovery resource pool (which is referred to as a type 1 parameter). The type 1 parameter is a transmission power parameter set for each resource pool by the network. The type 1 parameter may be expressed as Po, pool_x for the resource pool X. For the resource pool X, Po, pool_x may represent either a high transmission power, a medium transmission power or a low transmission power. A specific value of the transmission power may depend on implementations. The type 2 parameter is a transmission power parameter applied by the UE in order to limit a transmission power thereof when the D2D discovery message is transmitted using the D2D discovery resource pool having the range class longer than the range class for the D2D discovery message. The type 2 parameter may be represented as Po, short, Po, medium, Po, high. In other words, the type 1 parameter may be a transmission power parameter determined based on the range class for the D2D discovery resource pool, while the type 2 parameter may be regarded as a transmission power parameter selected by the terminal to limit the transmission power thereof determined based on the type 1 parameter.

For example, the terminal may use a following transmission power equation when transmitting the D2D discovery message:

$$P_{PSSCH} = \min\{P_{cMAX,PSSCH}, 10 \log_{10}(M_{PSSCH}) + P_{O\_PSSCH,1} + \alpha_{PSSCH,1} \cdot PL\}_{[dBm]},$$ [Equation 3]

where $P_{CMAX,PSSCH}$ represents a configured maximum UE output power for a physical sidelink shared channel (PSSCH) capable of transmitting a signal according to the D2D operation. $M_{PSSCH}$ refers to a band of PSSCH resource allocation represented by the number of resource blocks, PL refers to a path loss, $P_{O\_PSSCH,1}$, $\alpha_{PSSCH,1}$ refer to parameters set by a higher layer and are related to PSSCH resource setting. In this connection, $P_{O\_PSSCH,1}$, $\alpha_{PSSCH,1}$ refer to transmission power parameters set by the network based on the range class for the D2D discovery resource pool, and may correspond to the above-described type 1 parameter. In the case of transmitting the D2D discovery message using the D2D discovery resource pool having a range class longer than the range class for the D2D discovery message, the type 2 parameter may be used instead of the type 1 parameters such as $P_{O\_PSSCH,1}$, $\alpha_{PSSCH,1}$. In this connection, the type 2 parameter may have a value lower than the values of $P_{O\_PSSCH,1}$, $\alpha_{PSSCH,1}$.

In addition, the terminal may use a following transmission power equation when transmitting a signal according to D2D communication.

$$P_{PSSCH} = \min\{P_{CMAX,PSSCH}, 10 \log_{10}(M_{PSSCH}) + P_{O\_PSSCH,2} + \alpha_{PSSCH,2} \cdot PL\}_{[dBm]}$$ [Equation 4]

In the above equation 4, $P_{CMAX,PSSCH}$ represents a configured maximum UE output power for a physical sidelink shared channel (PSSCH) capable of transmitting a signal according to the D2D operation. The $M_{PSSCH}$ refers to a bandwidth of a PSSCH resource allocation represented by the number of resource blocks, PL refers to a path loss. $P_{O\_PSSCH,2}$, $\alpha_{PSSCH,2}$ refer to parameters set by a higher layer and are related to PSSCH resource setting.

In this connection, $P_{O\_PSSCH,2}$, $\alpha_{PSSCH,2}$ refer to transmission power parameters set by the network based on the range class for the D2D discovery resource pool, and may correspond to the above-described type 1 parameter. In the case of transmitting the D2D discovery message using the D2D discovery resource pool having a range class longer than the range class for the D2D discovery message, the type 2 parameter may be used instead of the type 1 parameters such as $P_{O\_PSSCH,2}$, $\alpha_{PSSCH,2}$. In this connection, the type 2 parameter may have a value lower than the values of $P_{O\_PSSCH,2}$, $\alpha_{PSSCH,2}$.

Figure 14:
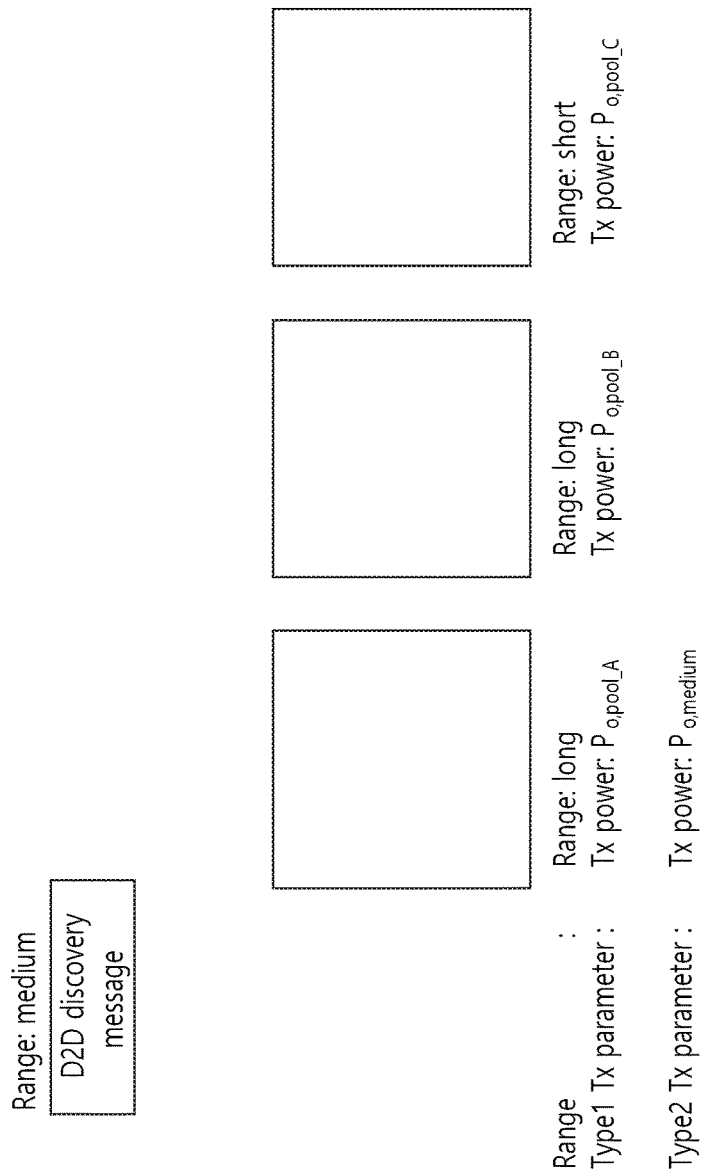
FIG. 14 illustrates a type 2 parameter when the D2D discovery message is transmitted using a D2D discovery resource pool having a range class longer than the range class of the D2D discovery message.

FIG. 14 illustrates a type 2 parameter when the D2D discovery message is transmitted using a D2D discovery resource pool having a range class longer than the range class of the D2D discovery message.

Referring to FIG. 14, UE may attempt to transmit a D2D discovery message whose range class is a medium distance.

In addition, a D2D discovery resource pool A may have a long distance in terms of the range class, and Po, pool_A may be set as the type 1 parameter. Po, pool_A may indicate a high transmission power. A D2D discovery resource pool B may be a long distance in terms of a range class, and Po, pool_B may be set as a type 1 parameter. Po, pool_B may indicate a high transmission power. A D2D discovery resource pool C has a short distance in terms of the range class, and Po, pool_C may be set as the type 1 parameter. Po, pool_C may indicate a low transmission power.

As shown in FIG. 14, suppose that the terminal may not find out or be assigned the D2D discovery resource pool having the range class of the medium distance. More specifically, suppose that the terminal may find out or be assigned the D2D discovery resource pools A and B having the range class of the long distance and the D2D discovery resource pool C having the range class of the short distance. Further, suppose that the terminal has selected the D2D discovery resource pool A.

In this case, at the time of transmitting the D2D discovery message, instead of using the type 1 parameter Po, pool_A for the D2D discovery resource pool A, the terminal may use a type 2 parameter Po, medium. In this connection, Po, medium may indicate a medium transmission power.

That is, when transmitting the D2D discovery message using the D2D discovery resource pool having a range class longer than the range class for the D2D discovery message, the terminal itself uses the type 2 parameter to limit the transmission power of the D2D discovery message instead of the type 1 parameter set by the network for the selected D2D discovery resource pool.

Hereinafter, a method for indicating, using an index, whether a resource pool is for a public safety terminal, a non-public safety terminal, or both a public safety terminal and a non-public safety terminal will be described.

The D2D discovery message may vary in a total size of fields contained therein depending on whether or not the message is for the public safety terminal. Therefore, when the terminal does not know the exact size of the D2D discovery message, it is assumed that the size of the message has two sizes determined for the public safety and non-public safety terminals respectively. Thus, blind decoding should be performed twice. However, the current standard specifies only one size for the D2D discovery message.

If D2D communication is possible only at certain frequencies where D2D operation is allowed, a public safety terminal performs D2D discovery for public safety at said certain frequencies, and the terminal performing the cellular communication (non-public safety terminal) is not allowed to use the certain frequencies in performing the D2D discovery, then it may not be very beneficial to distinguish between the resource pool for the public safety terminals and the resource pool for the non-public safety terminals.

On the other hand, it is necessary to consider the case where D2D communication is performed using predetermined resources at a further frequency (second frequency) at which the D2D operation is allowed while the public safety terminal camps on a general cellular frequency (first frequency) for D2D discovery.

D2D discovery may require a connection to a core network in order to be assigned the D2D application code and receive various reports and responses to the reports. Thus, it may be necessary for the terminal to camp on the cellular frequency to perform the D2D discovery. When the public safety terminal and the non-public terminal both are to perform the D2D discovery at the cellular frequency, it is preferable to specify and distinguish the resource pool for the public safety terminal and the resource pool for the non-public safety terminal.

In this respect, it is possible to set an index to the resource pool for the D2D operation, indicating whether the resource pool for the D2D operation is a resource pool for the public safety terminal or a resource pool for which there is no such restriction. Alternatively, the index may indicate whether the resource pool is for a public safety terminal, for a non-public safety terminal, or for both a public safety terminal and a non-public safety terminal.

Hereinafter, an example method of setting an index to a resource pool for D2D operation, a method of selecting a resource pool to which an index is set, and the like will be described.

Figure 15:
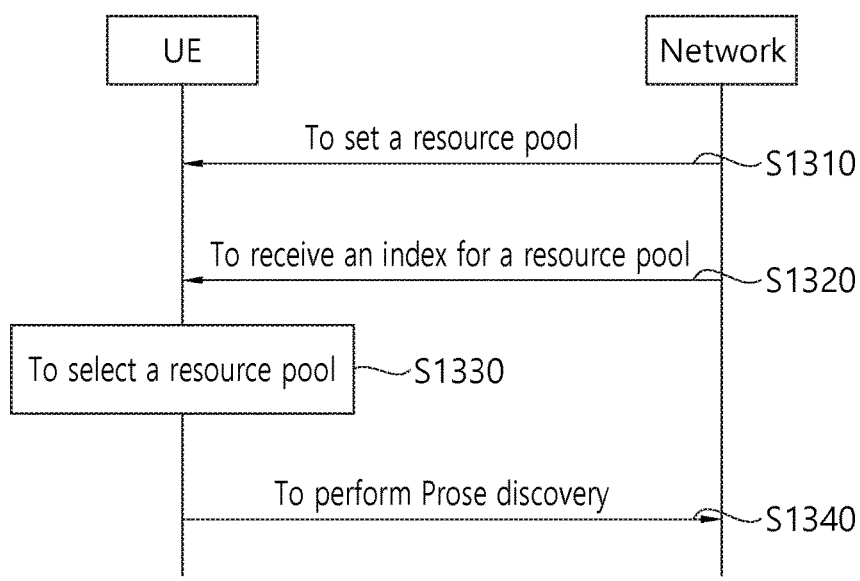
FIG. 15 illustrates a resource pool selection method according to an embodiment of the present invention.

FIG. 15 illustrates a resource pool selection method according to an embodiment of the present invention.

Referring to FIG. 15, a terminal receives a resource pool from a network (S1310). The resource pool received by the terminal may include at least one resource pool. In this connection, although, for convenience of description, the terminal receives the resource pool from the network, the terminal may already know the resource pool.

The terminal receives an index for the resource pool from the network (S1320). The index received by the terminal may indicate information about a specific usage for each resource pool received by the terminal. The terminal or UE may receive multiple indices or a single index from the network. Hereinafter, the case that UE receives a plurality of indexes from the network and the case that UE receives a single index from the network will be individually described.

1. The Case when the Terminal Receives a Plurality of Indexes

One resource pool may be assigned one or more indexes, where each index may indicate a different usage for each resource pool. Hereinafter, examples of the indexes that may allocated to the resource pools will be described with reference to 1) a first index, 2) a second index, and 3) a third index.

1) First Index

The first index is expressed using bits or a bitstring. The first index indicates which type of a terminal is allowed to a resource pool corresponding to the first index. The type of the terminal may include a public safety terminal (PS UEs) and/or non-public safety terminal (non-PS UEs). That is, the network may transmit, using the first index, information on whether each resource pool is used for the public safety UEs (PS UEs) and/or non-public safety UEs (non-PS UEs). Alternatively, the network may indicate that each resource pool may be used with connection to a particular usage for a public safety terminal or for a public safety purpose.

For example, the particular usage for a public safety terminal or for a public safety purpose may refer to communication with a UE-to-network relay or discovery of a UE-to-network relay. In this connection, the UE-to-network relay provides connectivity to the network for terminals outside the coverage of the base station through a direct communication link between the terminals.

The details about classification of the resource pools are as follows:
- a pool of resources limited to equivalents of direct communication regarding public safety UEs (PS UEs) or public safety purpose; or
- a pool of resources limited to equivalents of direct discovery regarding public safety UEs (PS UEs) or public safety purpose; or
- a pool of resources limited to relay direct communication regarding public safety UEs (PS UEs) or public safety purpose; or
- a pool of resources limited to relay direct discovery regarding public safety UEs (PS UEs) or public safety purpose; or—a pool of resources limited to non-public safety UEs equivalent to direct communication regarding public safety purposes or non-public safety purposes or public safety UEs (PS UEs)
- a pool of resources limited to non-public safety UEs equivalent to direct discovery regarding public safety purposes or non-public safety purposes or public safety UEs (PS UEs)
- a pool of resources limited to non-public safety UEs equivalent to direct communication regarding non-public safety purposes,
- a pool of resources limited to non-public safety UEs equivalent to direct discovery regarding non-public safety purposes.

A method of signaling the above-mentioned first index is as follows.
- A base station may signal one bit sequence having a size of N bits to the terminal. In this connection, a MSB (Most Significant Bit) in one bit string having the size of N bits, that is, the leftmost bit in the bits sequence may be designated as an index 1, and an upper area having a size of M bits in the remaining of the bit string may be designated as an index 2.
- The base station may signal two fields to the terminal. In this connection, the base station may designate one field as an index 1 and the other field as an index 2.

In one example, two bits may be used to represent the above indices (i.e., index 1, index 2). One bit of the two bits (hereafter, bit 1) indicates whether the terminal is allowed to use the corresponding resource pool for the purpose of public safety (PS). The remaining one bit (hereinafter, bit 2)

indicates whether the terminal is allowed to use the corresponding resource pool for the purpose of non-public safety (non-PS). When the bits to represent the above-defined index are equal to {bit 1, bit 2}, {True, True} means that the terminal is allowed to use the corresponding resource pool for the purpose of public safety (PS), and that the terminal is allowed to use the corresponding resource pool for non-public safety (non-PS) purposes. Likewise, {True, False} means that the terminal is allowed only to use the corresponding resource pool for the purpose of public safety. Further, {False, True} means that the terminal is allowed only to use the corresponding resource pool for the purpose of non-public safety.

As another example, only one index may be used to represent the index described above. That is, a first code of the index indicates that the terminal is allowed to use the corresponding resource pool for the purpose of public safety, a second code of the index indicates that the terminal is allowed to use the corresponding resource pool for the purpose of non-public safety, and a third code of the index may indicate that the terminal is allowed to use the corresponding resource pool for public and non-public safety purposes.

2) Second Index

The second index is expressed using bits or bitstring and indicates a range class whereby the terminal is allowed to select a specific resource pool corresponding to the range class. The range class may be as follows:

Limited to a long range only: this may be indicated via the presence of a code (e.g., long) corresponding to a long range in the second index field. That is, when there is a code "long" in the second index field, the terminal may identify from the code that the resource pool corresponding to the second index is used for the long range.

Limited to a medium range only: this may be indicated via the presence of a code (e.g., medium) corresponding to a medium range in the second index field. That is, when there is a code "medium" in the second index field, the terminal may identify from the code that the resource pool corresponding to the second index is used for the medium range.

Limited to a short range only: this may be indicated via the presence of a code (e.g., short) corresponding to a short range in the second index field. That is, when there is a code "short" in the second index field, the terminal may identify from the code that the resource pool corresponding to the second index is used for the short range.

Medium and long ranges: this may be indicated via the presence of a code (e.g., medium) corresponding to a medium range in the second index field. That is, when there is a code "medium" in the second index field, the terminal may identify from the code that the resource pool corresponding to the second index is used for the medium and long ranges. Alternatively, when i) the second index field contains a code (e.g., "medium") corresponding to a medium range, and ii) the terminal further receives information from the base station indicating that the terminal is allowed to use the resource pool corresponding to a discovery range class longer than the medium range, the terminal may identify from the code that the resource pool corresponding to the second index is used for the long range as well as the medium range.

Short, medium and long ranges: this may be indicated via the presence of a code (e.g., short) corresponding to a short range in the second index field. That is, when there is a code "short" in the second index field, the terminal may identify from the code that the resource pool corresponding to the second index is used for the short, medium and long ranges. Alternatively, when i) the second index field contains a code (e.g., "short") corresponding to a short range, and ii) the terminal further receives information from the base station indicating that the terminal is allowed to use the resource pool corresponding to a discovery range class longer than the short range, the terminal may identify from the code that the resource pool corresponding to the second index is used for the short, medium and long ranges.

Third Index

The third index may be expressed using bits or bitstring and indicates a coverage class whereby the terminal is allowed to select a specific resource pool corresponding to the coverage class. The coverage class may be as follows:

In-coverage: The terminal may identify from the third index that the resource pool corresponding to the third index can be used in an in-coverage mode. In this connection, the in-coverage mode means that the UE is within the cell coverage.

Out-of-coverage: The terminal may identify from the third index that the resource pool corresponding to the third index can be used in an out-of-coverage mode. In this connection, the out-of-coverage mode means that the UE is out of the cell coverage.

In-coverage and Out-of-coverage: The terminal may identify from the third index that the resource pool corresponding to the third index can be used in both the in-coverage and out-of-coverage modes.

Example embodiments of a method for signaling the usage of the resource pool using the first index and the second index are shown in a table 2 below.

TABLE 2

| Resource pool type | First index | Second index | Usage |
| --- | --- | --- | --- |
| Serving RX | PS only | N/A | Only the public safety terminal may use this RX resource pool in connection with direct communication. The terminal may use the RX resource pool in connection with direct communication only for a public safety purpose. |
| Serving RX | Non-PS only | N/A | Only the non-public safety terminal may use this RX resource pool in connection with direct communication. The terminal may use the RX resource pool in connection with direct communication only for a non-public safety purpose. |
| Serving TX | PS only | Long | Only the public safety terminal may use this TX resource pool in connection with direct and long range communication. The terminal may use the TX resource pool in connection with direct and long range communication only for a public safety purpose. |

TABLE 2-continued

| Resource pool type | First index | Second index | Usage |
|---|---|---|---|
| Serving TX | Non-PS only | Medium | Only the non-public safety terminal may use this TX resource pool in connection with direct and medium range communication. The terminal may use the TX resource pool in connection with direct and medium range communication only for a non-public safety purpose. |
| Serving TX | Non-PS only | Short | Only the non-public safety terminal may use this TX resource pool in connection with direct and short range communication. The terminal may use the TX resource pool in connection with direct and short range communication only for a non-public safety purpose. |
| Neighbor cell#1 RX | PS only | N/A | Only the public safety terminal may use this RX resource pool in connection with direct communication. The terminal may use the RX resource pool in connection with direct communication only for a public safety purpose. |
| Neighbor cell#1 RX | Non-PS only | N/A | Only the non-public safety terminal may use this RX resource pool in connection with direct communication. The terminal may use the RX resource pool in connection with direct communication only for a non-public safety purpose. |
| Neighbor cell#2 RX | PS only | N/A | Only the public safety terminal may use this RX resource pool in connection with direct communication. The terminal may use the RX resource pool in connection with direct communication only for a public safety purpose. |
| Neighbor cell#2 RX | Non-PS only | N/A | Only the non-public safety terminal may use this RX resource pool in connection with direct communication. The terminal may use the RX resource pool in connection with direct communication only for a non-public safety purpose. |

In Table 2, "Serving RX" refers to a reception antenna of a serving cell, "Serving TX" refers to a transmission antenna of the serving cell, "Neighbor cell #1 RX" refers to a reception antenna of a first neighboring cell, and "Neighbor cell #2 RX" refers to a reception antenna of a second neighboring cell.

2. The Case when the Terminal Receives a Single Index

The UE may receive only one index that identifies the usage of the resource pool from the network. A specific embodiment thereof is shown in a table 3 below.

TABLE 3

| Index | Semantics #1: PS or non-PS | Semantics #1: Discovery range | Usage |
|---|---|---|---|
| C | PS | Any | The terminal may use the resource pool for a public safety purpose. |
| C + 1 | Non-PS | Any | Alt1) The terminal may use the resource pool for a non-public safety purpose. Alt2) The terminal may use the resource pool for public and non-public safety purposes. |
| Reserved area | | | |
| P | Any | Long | The terminal may use the resource pool in connection with direct and long range communication. |
| P + 1 | Any | Medium | The terminal may use the resource pool in connection with direct and medium range communication. |
| P + 2 | Any | Short | The terminal may use the resource pool in connection with direct and short range communication. |
| H + 1 | PS | Long | The terminal may use the resource pool in connection with direct and long range communication for a public safety purpose. |
| H + 2 | PS | Medium | The terminal may use the resource pool in connection with direct and medium range communication for a public safety purpose. |
| H + 3 | PS | Short | The terminal may use the resource pool in connection with direct and short range communication for a public safety purpose. |

TABLE 3-continued

| | Semantics #1:<br>PS or non-PS | Semantics #1:<br>Discovery range | Usage |
|---|---|---|---|
| N | Non-PS | Long | The terminal may use the resource pool in connection with direct and long range communication for a non-public safety purpose. |
| N + 1 | Non-PS | Medium | The terminal may use the resource pool in connection with direct and medium range communication for a non-public safety purpose |
| N + 2 | Non-PS | Short | The terminal may use the resource pool in connection with direct and short range communication for a non-public safety purpose |

In Table 3, "Semantics # 1" represents information on public safety or non-public safety, and "Semantics # 2" represents information on a direct communication range.

Further embodiments that may be applied to the public safety and non-public terminals for the case 1 where the terminal receives a plurality of indexes and for the case 2 where the terminal receives a single index are as follows.

Differentiation Between Public Safety Terminal/Non-Public Safety Terminal

A NAS (Non-Access Stratum) of the terminal may determine whether the terminal is a public safety terminal or a non-public safety terminal. The NAS of the terminal may provide the determination to t AS (Access Stratum) of the terminal, for example, to instruct selection of the resource pool. This means individual terminal differentiation. When the network distinguishes between an access control parameter for the public safety terminal and the access control parameter for the non-public safety terminal and broadcasts separately them through system information, the access control may performed using the access control parameter for the public safety terminal regarding the public safety terminal. For example, a separate parameter which the public safety terminal applies for an Access Class Barring parameter may be provided to the terminal.

When the terminal is associated with a normal access class (range between 0 and 9), the terminal may be considered a non-public safety terminal. When the terminal is associated with a special access class (range between 11 and 15), the terminal may be considered as a public safety terminal.

When the higher layer of the terminal requests direct communication of the Access Stratum (AS) of the terminal, the terminal's NAS may indicate whether the direct communication is for public safety or non-public safety. Alternatively, when the higher layer of the UE requests discovery signal announcement of the Access Stratum (AS) of the UE, the NAS of the UE may indicate whether the discovery signal is related to UE-to-network relay discovery or not. That is, the higher layer may request discovery announcement of the AS of the terminal. In this connection, the higher layer may be a Non-Access Stratum (NAS) or a ProSe protocol layer of the terminal. To determine whether the discovery signal is for public safety or non-public safety, or whether the discovery signal is for the UE-to-network relay discovery or for other purposes means differentiation of a separate Prose application code. In this connection, via ProSe discovery session differentiation, it is possible to continuously inform the terminal AS of the differentiation of the Prose application code.

In the above embodiment, a method has been proposed for indicating, via the index associated with each pool, whether the radio resource pool is related to a public safety purpose or non-public safety purpose or to the above-mentioned other purpose. As a simpler approach to distinguish whether the radio resource pool is for the public or non-public safety purpose, when the network broadcasts the resource pool, the resource pool associated with the public safety purpose and the resource pool associated with the non-public safety purpose are separately signaled, wherein the resource pool associated with the public safety purpose and the resource pool associated with the non-public safety purpose are differently referred to as. In this way, the terminal may use the resource pool corresponding to the purpose. For example, the resource pool related to the public safety purpose may be referred to as a first resource pool, and the resource pool related to the non-public safety purpose may be referred to as a second resource pool. In this connection, the first resource pool and second resource pool may have different pool names, and the first resource pool and the second resource pool may be signaled separately.

Similarly, to distinguish whether the radio resource pool is related to the UE-to-network relay or other purposes, when the network broadcasts a pool of resources, the radio resource pool for the UE-to-network relay or the radio resource pool for the other purposes may be signaled separately. Thus, the resource pools for different purposes may be identified by different pool names. For example, a pool for the UE-to-network relay may be referred to as a first resource pool, and the pool for the other purposes may be referred to as a second resource pool. In this connection, the first and second resource pools may have different pool names, and the first resource pool and the second resource pool may be signaled separately.

In one embodiment, the network may signal transmission resources to the terminal together with distinguishing between the transmission resources based on usages thereof, and may signal an integrated receiving pool to the terminal without distinguishing between receiving resources based on usages thereof. In this way, the terminal selects and transmits a resource corresponding to a target purpose or usage. As a result, transmission quality for each usage may be ensured, and data transmitted by other terminals may be received without missing.

Others

When the public safety terminal applies indexes related to signaled resource pools, the public safety terminal may be allowed to ignore information related to the direct communication (e.g., the discovery range) wherein, for example, the information may be the second index when the terminal receives a plurality of indexes. This may be equally applied to a terminal for direct communication (e.g., announcement of the discovery signal) for the public safety purpose.

In addition, the public safety terminal may be allowed to be applied to an open loop power control parameter. In addition, the public safety terminal may not be applied to the open loop power control parameter. For example, regardless of the measured pathloss, the terminal may estimate the value of the fixed power when determining the transmit power for direct communication (e.g., the discovery announcement). This may equally be applied to direct communication (e.g., announcement of the discovery signal) for a public safety purpose.

The terminal selects a resource pool based on the received index (S1330). More specifically, the terminal may compare the usage of the resource pool indicated by the index with the usage intended by the terminal, and then may select a resource pool that supports the usage intended by the terminal.

When an index indicating a specific purpose or usage is set to the same for a plurality of resource pools, the terminal may set an upper limit RSRP value and a lower limit RSRP value for each resource pool, and may increment the RSRP value by 10 dB within a range {−infinity, −110 . . . −60, +infinity} dBm for each resource pool. Then, the terminal may perform the RSRP measurement, and may select an appropriate resource pool based on the measurement. When the appropriate resource pool cannot be selected through the RSRP measurement described above, the UE may randomly select a resource pool among the resource pools meeting the power setting of the UE and the network.

Thereafter, the UE performs direct communication based on the selected resource pool (S1340). A specific method of performing the direct communication based on the selected resource pool may be as described above.

Figure 16:
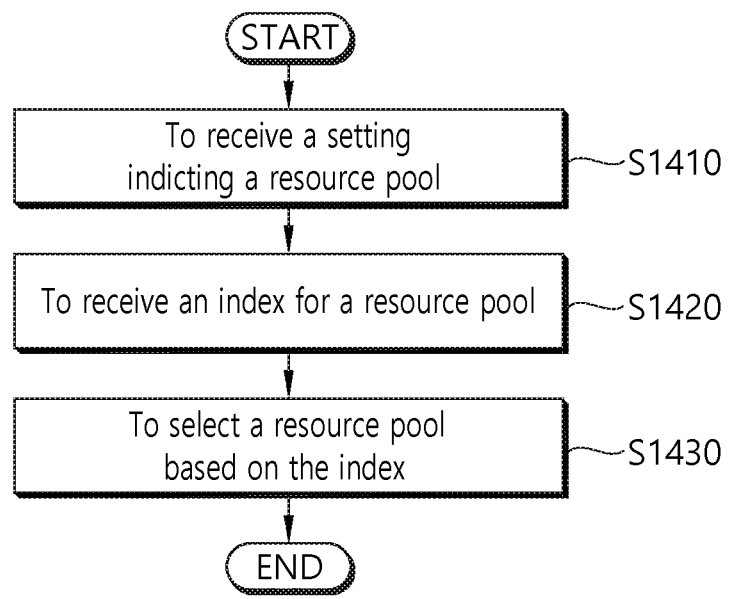
FIG. 16 is a flowchart of a resource pool selection method according to an embodiment of the present invention.

FIG. 16 is a flowchart of a resource pool selection method according to an embodiment of the present invention.

Referring to FIG. 16, a terminal receives a setting for a resource pool from a network (S1410). In this connection, the detailed contents about the terminal receiving the resource pool from the network may be as described above.

The UE receives an index for the resource pool from the network (S1420). In this connection, the UE may receive the index for the resource pool from the network as described above. In the above-described embodiments, the operation of the terminal receiving the resource pool from the network and the operation of the terminal receiving the index of the resource pool from the network are separate from each other. However, the operation of the terminal receiving the resource pool from the network and the operation of the terminal receiving the index of the resource pool from the network may be combined into a single operation. That is, the terminal may simultaneously receive the index of the resource pool and the resource pool from the network.

The UE selects a resource pool corresponding to the usage of the UE based on the received index (S1430). In this connection, the UE may select the resource pool corresponding to the usage of the UE based on the received index as described above.

Figure 17:
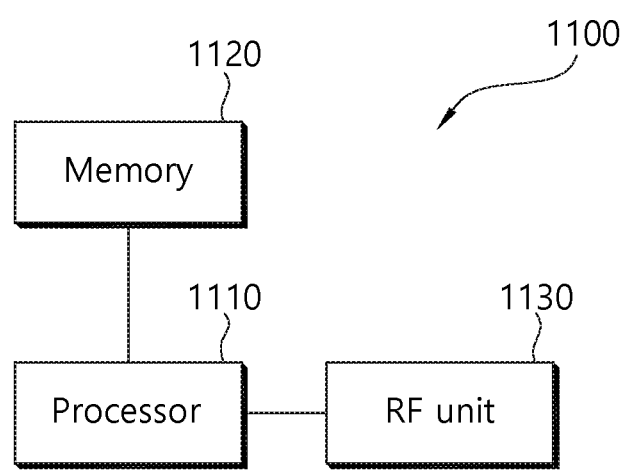
FIG. 17 is a block diagram illustrating a terminal (or UE) in which an embodiment of the present invention is implemented.

FIG. 17 is a block diagram illustrating a terminal (or UE) in which an embodiment of the present invention is implemented.

Referring to FIG. 17, a UE 1100 includes a processor 1110, a memory 1120, and a radio frequency (RF) unit 1130. The processor 1110 implements the proposed functionality, process and/or method. For example, the processor 1110 may determine a range class for each of a plurality of D2D discovery resource pools and select, among the plurality of D2D discovery resource pools, a D2D discovery resource pool having a range class longer than a range class of the D2D discovery message when there is no D2D discovery resource pool having the range class equal to the range class of the D2D discovery message among the plurality of D2D discovery resource pools. Further, the processor 1110 may transmit the D2D discovery message using the selected D2D discovery resource pool.

The RF unit 1130 is connected to the processor 1110 to transmit and receive radio signals.

The processor may comprise an application-specific integrated circuit (ASIC), another chipset, logic circuitry and/or a data processing unit. The memory may include a read-only memory (ROM), a random access memory (RAM), a flash memory, a memory card, a storage medium, and/or other storage devices. The RF unit may include a baseband circuit for processing the radio signal. When the embodiment is implemented in software, the above-described techniques may be implemented with modules (procedures, functions, and so on) that perform the functions described above. The module may be stored in the memory and may be executed by the processor. The memory may be internal or external to the processor, and may be coupled to the processor by various well known means.

What is claimed is:

1. A method for transmitting a device-to-device (D2D) discovery message using a user equipment (UE) in a wireless communication system, the method comprising:
   determining a range class for each of a plurality of D2D discovery resource pools;
   selecting a D2D discovery resource pool having a range class longer than the range class of the D2D discovery message if determination that a D2D discovery resource pool having the same range class as a range class of a D2D discovery message is absent among the plurality of D2D discovery resource pools; and
   transmitting the D2D discovery message using the selected D2D discovery resource pool.

2. The method of claim 1, further comprising receiving an index for each of the plurality of D2D discovery resource pools.

3. The method of claim 2, wherein the index indicates a range in which a corresponding D2D discovery resource pool is available.

4. The method of claim 3, further comprising setting a transmission power parameter for each of the plurality of D2D discovery resource pools.

5. The method of claim 2, wherein transmitting the D2D discovery message using the selected D2D discovery resource pool comprises:
   selecting, by the UE, a second transmission power parameter other than a first transmission power parameter, wherein the first parameter is set for the selected D2D discovery resource pool by the network; and
   transmitting the D2D discovery message based on the second transmission power parameter.

6. The method of claim 5, wherein the first parameter is determined based on a range class of the D2D discovery resource pool, wherein the second parameter is selected by the UE to limit a transmission power determined based on the first parameter.

7. The method according to claim 1, wherein the range classes for the plurality of D2D discovery resource pools include a long range, a medium range, and a short range.

8. The method according to claim 1, wherein the range class for the D2D discovery message includes one of a long range, a medium range, and a short range.

9. A user equipment (UE), the UE comprising:
   a radio frequency (RF) unit configured to transmit and receive a radio signal; and
   a processor coupled to the RF unit, wherein the processor is configured to:

determine a range class for each of a plurality of D2D discovery resource pools;

select a D2D discovery resource pool having a range class longer than the range class of the D2D discovery message if determination that a D2D discovery resource pool having the same range class as a range class of a D2D discovery message is absent among the plurality of D2D discovery resource pools; and transmit the D2D discovery message using the selected D2D discovery resource pool.

* * * * *